United States Patent
Okoli et al.

(10) Patent No.: US 7,862,322 B2
(45) Date of Patent: Jan. 4, 2011

(54) RESIN INFUSION BETWEEN DOUBLE FLEXIBLE TOOLING SYSTEM

(75) Inventors: Okenwa O.I Okoli, Tallahassee, FL (US); Alvin Paul Lim, Tallahassee, FL (US)

(73) Assignee: Florida State University Research Foundation, Tallahassee, FL (US)

(*) Notice: Subject to any disclaimer, the term of this patent is extended or adjusted under 35 U.S.C. 154(b) by 222 days.

(21) Appl. No.: 11/789,805

(22) Filed: Apr. 25, 2007

(65) Prior Publication Data

US 2007/0278718 A1 Dec. 6, 2007

Related U.S. Application Data

(60) Provisional application No. 60/794,576, filed on Apr. 25, 2006.

(51) Int. Cl.
*B01F 13/00* (2006.01)

(52) U.S. Cl. .................. 425/200; 425/405.1; 264/69; 366/336; 366/337; 366/131; 366/340; 366/341

(58) Field of Classification Search .......... 264/299, 264/69; 425/408, 200, 405.1; 366/336, 337, 366/131, 341, 340

See application file for complete search history.

(56) References Cited

U.S. PATENT DOCUMENTS

| | | | |
|---|---|---|---|
| 4,338,070 A | 7/1982 | Nava | |
| 4,657,717 A | 4/1987 | Cattanach et al. | |
| 4,808,362 A | 2/1989 | Freeman | |
| 4,975,311 A | 12/1990 | Lindgren | |
| 5,108,532 A | 4/1992 | Thein et al. | |
| 5,128,090 A | 7/1992 | Fujii et al. | |
| 5,151,277 A | 9/1992 | Bernardon et al. | |
| 5,192,560 A | 3/1993 | Umetsu et al. | |
| 5,464,337 A * | 11/1995 | Bernardon et al. | 425/112 |
| 5,686,038 A * | 11/1997 | Christensen et al. | 264/257 |
| 5,820,894 A | 10/1998 | Kreutzer | |
| 6,276,921 B1 | 8/2001 | Kouda et al. | |
| 6,508,974 B1 | 1/2003 | Loving | |
| 6,537,483 B1 | 3/2003 | Cartwright et al. | |
| 6,558,590 B1 | 5/2003 | Stewart | |
| 6,623,672 B2 | 9/2003 | McCollum et al. | |
| 6,840,750 B2 | 1/2005 | Thrash et al. | |
| 6,861,017 B1 * | 3/2005 | McCarville et al. | 264/39 |
| 7,081,219 B2 | 7/2006 | Stewart | |
| 7,306,450 B2 | 12/2007 | Hanson | |
| 7,393,494 B2 | 7/2008 | Mataya et al. | |
| 7,409,920 B2 | 8/2008 | Mataya et al. | |
| 7,413,695 B2 | 8/2008 | Thrash et al. | |
| 7,553,435 B2 | 6/2009 | McCollum | |
| 2005/0255770 A1 | 11/2005 | Crump | |

* cited by examiner

*Primary Examiner*—Khanh Nguyen
*Assistant Examiner*—Saeed M Huda
(74) *Attorney, Agent, or Firm*—Sutherland Asbill & Brennan LLP

(57) ABSTRACT

A resin infusion system uses a housing that has an upper flexible diaphragm and a lower flexible diaphragm such that the two diaphragms form a cavity. A fiber reinforcement mat is positioned within the cavity. A mold is positioned below the lower diaphragm. A flow plate has a series of V-shaped grooves and is positioned either underneath the lower diaphragm or overtop the upper diaphragm so that the grooves press into the respective diaphragm. A vacuum is created within the housing causing resin to be drawn into the cavity with the resin interacting with the grooves increasing the turbulence of the resin flow. Once the reinforcement mat is properly wetted, the mold is pressed into the lower diaphragm.

21 Claims, 4 Drawing Sheets

RESIN INFUSION BETWEEN DOUBLE FLEXIBLE TOOLING SYSTEM

This application claims the benefit of provisional patent application No. 60/794,576 filed on Apr. 25, 2006, which provisional application is incorporated herein by reference.

BACKGROUND OF THE INVENTION

1. Field of the Invention

The present invention relates to a liquid resin composite molding technique that uses spaced apart flexible diaphragms for receiving a fiber reinforcement and a mold such that the reinforcement mat holding diaphragms are vacuum pressed into the mold.

2. Background of the Prior Art

Fiber reinforced composite materials are an important class of engineering materials that offer outstanding mechanical properties and unique design flexibility. Such materials are lightweight, corrosive resistant, impact resistant, and exhibit excellent fatigue strength. Composite materials are used in a wide variety of applications including automotive parts, aviation, marine vessels, offshore structures, containers and piping, and sporting goods among others. Liquid composite molding, which includes resin transfer molding, reaction injection molding, and resin infusion, is one of the most attractive manufacturing solutions for producing high quality, affordable, and environmentally friendly composite materials.

Recently, a considerable amount of progress has been achieved in liquid composite molding techniques such as constituent material development, tooling, reinforcement preform development, curing control, and process simulation. These advances have lifted the liquid composite molding process to new heights.

One major hurdle that continues to receive considerable attention concerns the costs of liquid composite molding. In most techniques, the part being made is formed between an upper mold and a lower mold. Each of these molds is very costly and the molds are very time consuming to produce. Additionally, as the resin contacts the surface of the molds, each mold must be cleaned and prepared between cycles. Furthermore, the resin flows into the cavity between the molds in three dimensions. This three dimensional resin flow makes flow control complicated and increases the potential for end product defects due to dry spots. As defective parts cannot be repaired, they must be discarded adding to the overall manufacturing costs of the products being produced.

Therefore, there exists a need in the art for a liquid composite molding technique that reduces overall manufacturing costs and decreases product defect potential. Specifically, such a technique must eliminate the need for one of the molds used to manufacture a part and the single mold being used should be relatively easy to produce and must not need to be prepared between cycles. The technique must eliminate the need for the three dimensional resin flow currently used in other prior art techniques in order to reduce overall manufacturing complexity and also to reduce the potential for product defect.

SUMMARY OF THE INVENTION

The resin infusion between double flexible tooling system of the present invention addresses the aforementioned needs in the art. The resin infusion between double flexible tooling system reduces overall manufacturing costs and decreases product defect potential. The present invention uses a single mold to manufacture a part wherein the single mold used is easy to produce and does not need to be prepared between cycles. The three system eliminates the need for the three dimensional resin flow currently found in other prior art techniques, thereby reducing overall manufacturing complexity and also reducing the potential for product defect.

The resin infusion between double flexible tooling system of the present invention is comprised of a housing that has an upper flexible diaphragm and a lower flexible diaphragm with the two diaphragms capable of forming a sealed cavity. A fiber reinforcement mat is positioned within the cavity. An appropriately shaped mold is positioned below the lower diaphragm and is capable of being pressed into the lower diaphragm. A flow plate that has a series of grooves therein, is positioned either underneath the lower diaphragm or overtop the upper diaphragm such that the grooves press into the respective diaphragm. A vacuum is created within the housing causing resin to be drawn into the cavity via an inlet gate. The grooves that press into either the lower diaphragm or the upper diaphragm cause the inflowing resin to interact with the grooves thereby causing turbulence within the resin that is flowing within the cavity. Once the mat is properly wetted, the mold is pressed into the lower diaphragm. The cavity facing surface of the upper diaphragm, the lower diaphragm, or both are coated with a nonstick material. The mold is made from a porous material. The grooves are generally V-shaped with the point of the V, pointing generally toward the outlet gate. The grooves have variable depths.

BRIEF DESCRIPTION OF THE DRAWINGS

Similar reference numerals refer to similar parts throughout the several views of the drawings.

DESCRIPTION OF THE PREFERRED EMBODIMENT

Figure 1:
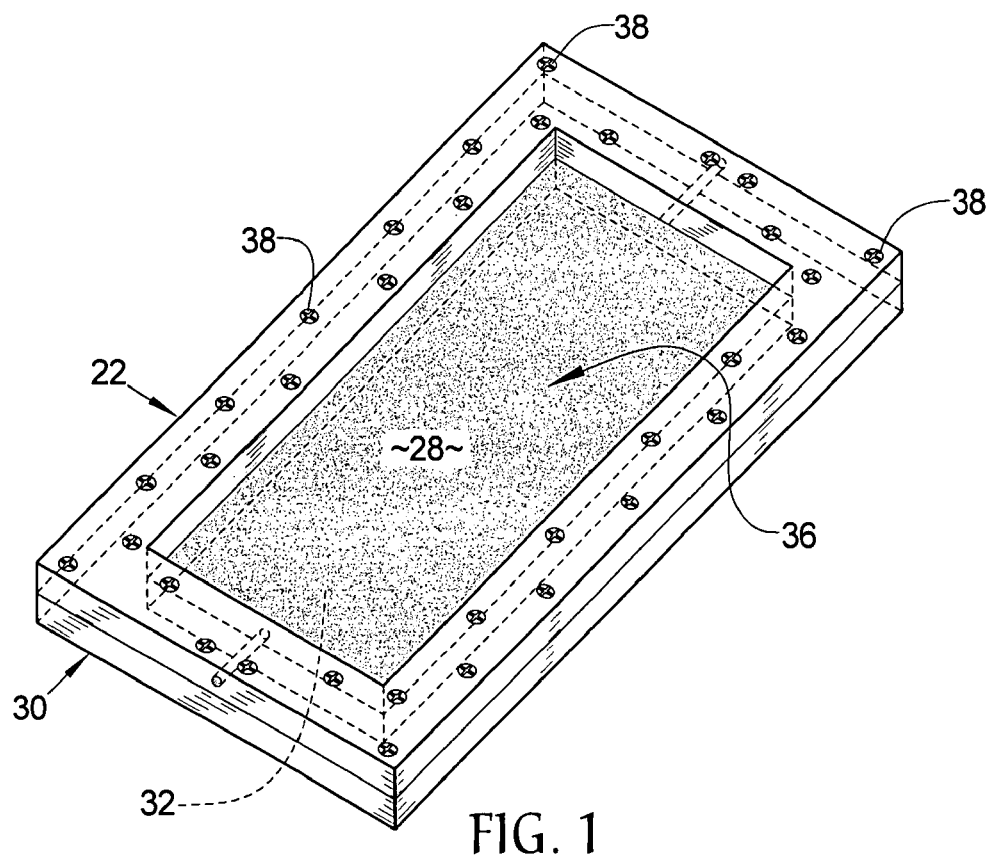
FIG. 1 is a perspective view of the upper frame member mated with the lower frame member that are used with the resin infusion between double flexible tooling system of the present invention.
Figure 2:
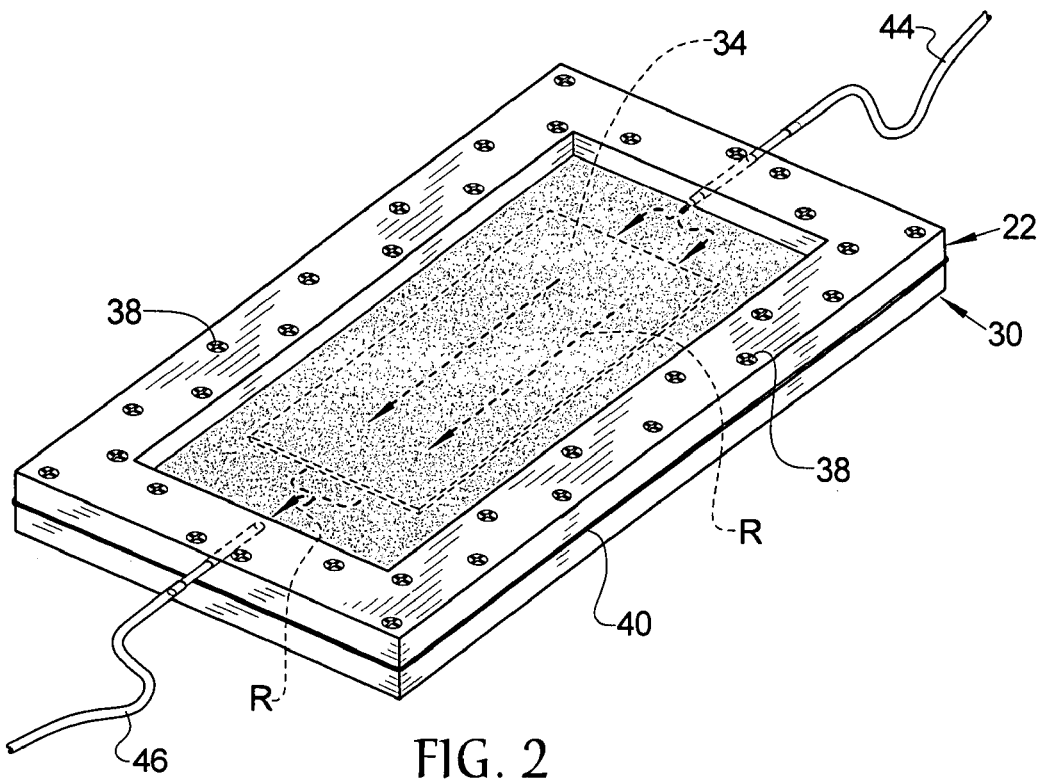
FIG. 2 is a perspective view of the upper frame member mated with the lower frame member with resin being pulled through the resin chamber.
Figure 3:
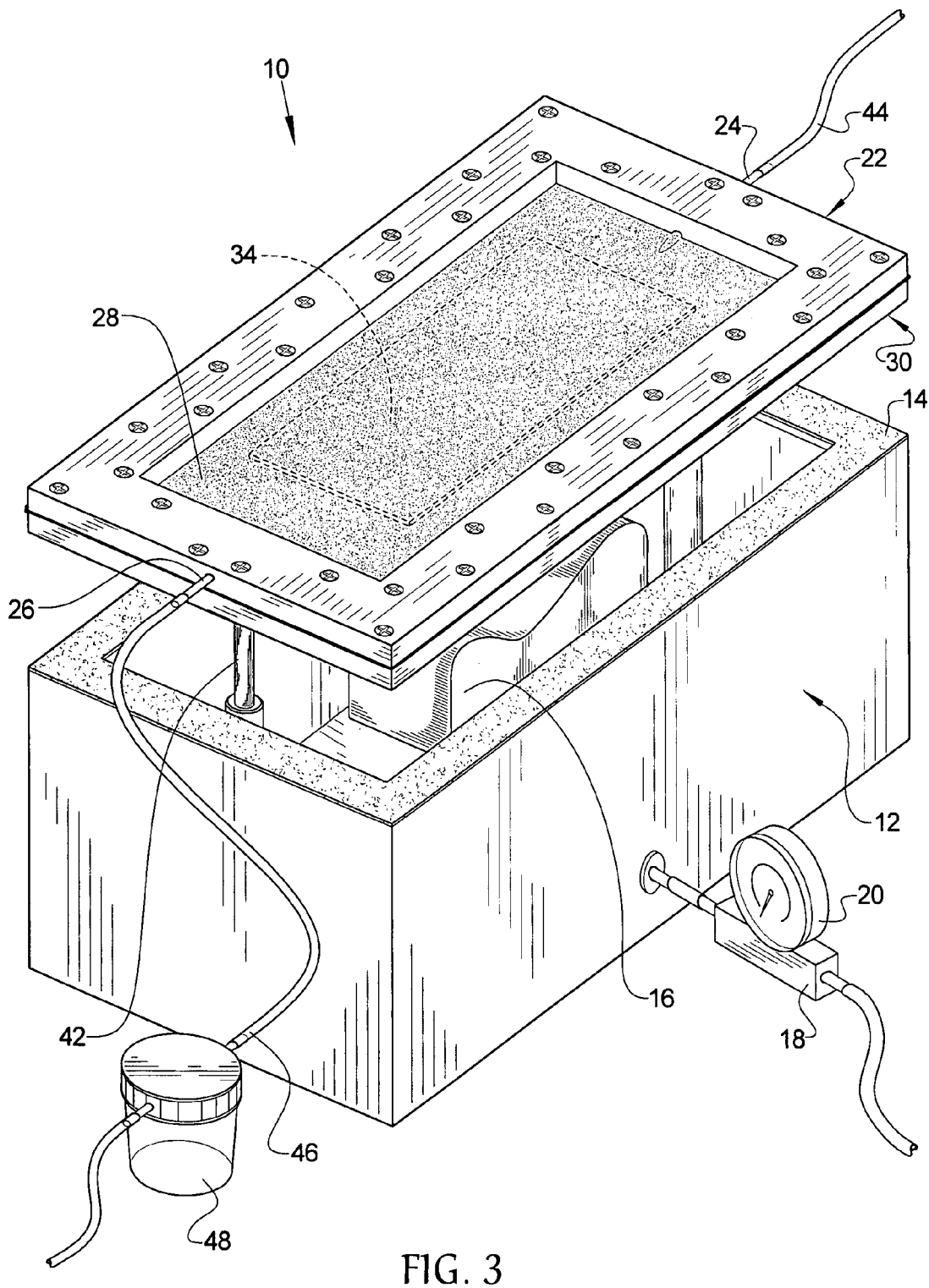
FIG. 3 is a perspective view of the mated upper frame and lower frame about to be drawn down onto a mold being held within the interior chamber of a housing.
Figure 4:
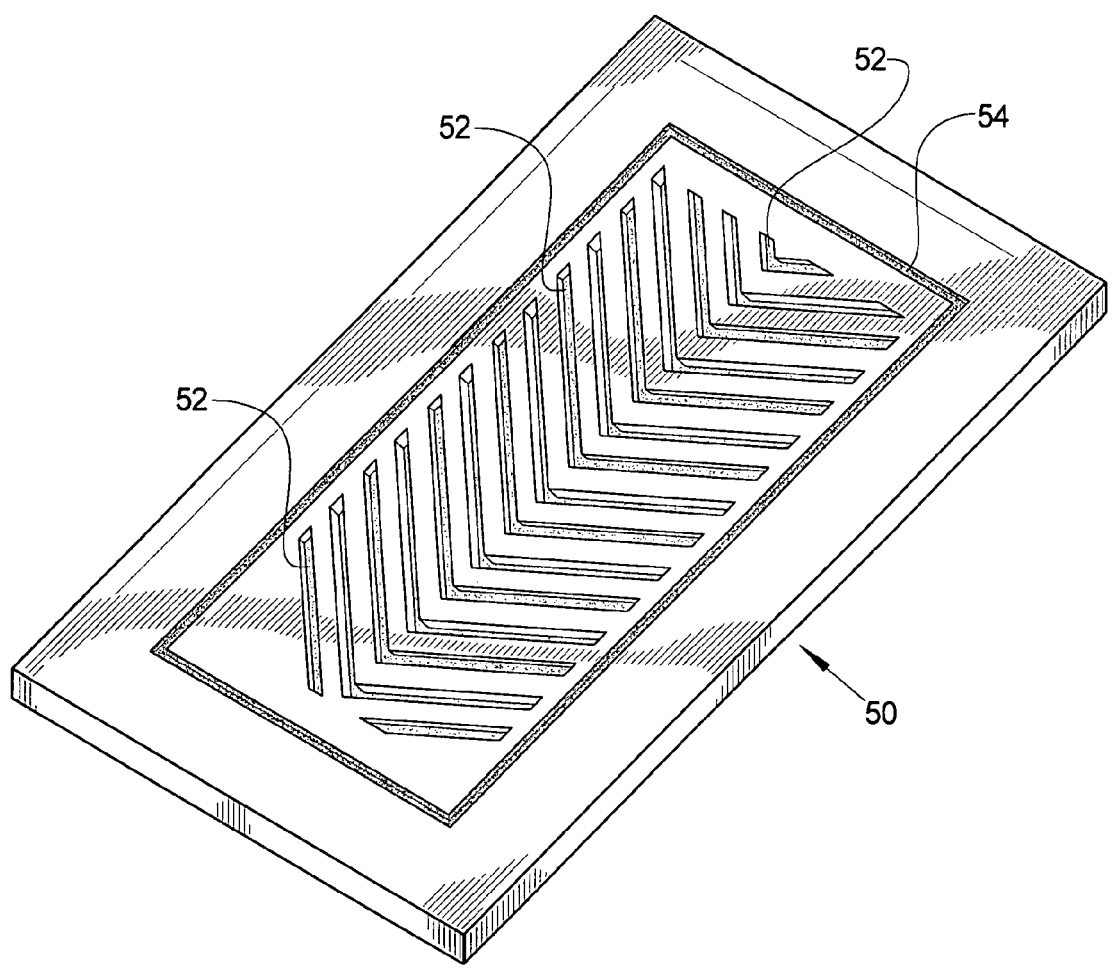
FIG. 4 is a perspective view of the flow plate.
Figure 5:
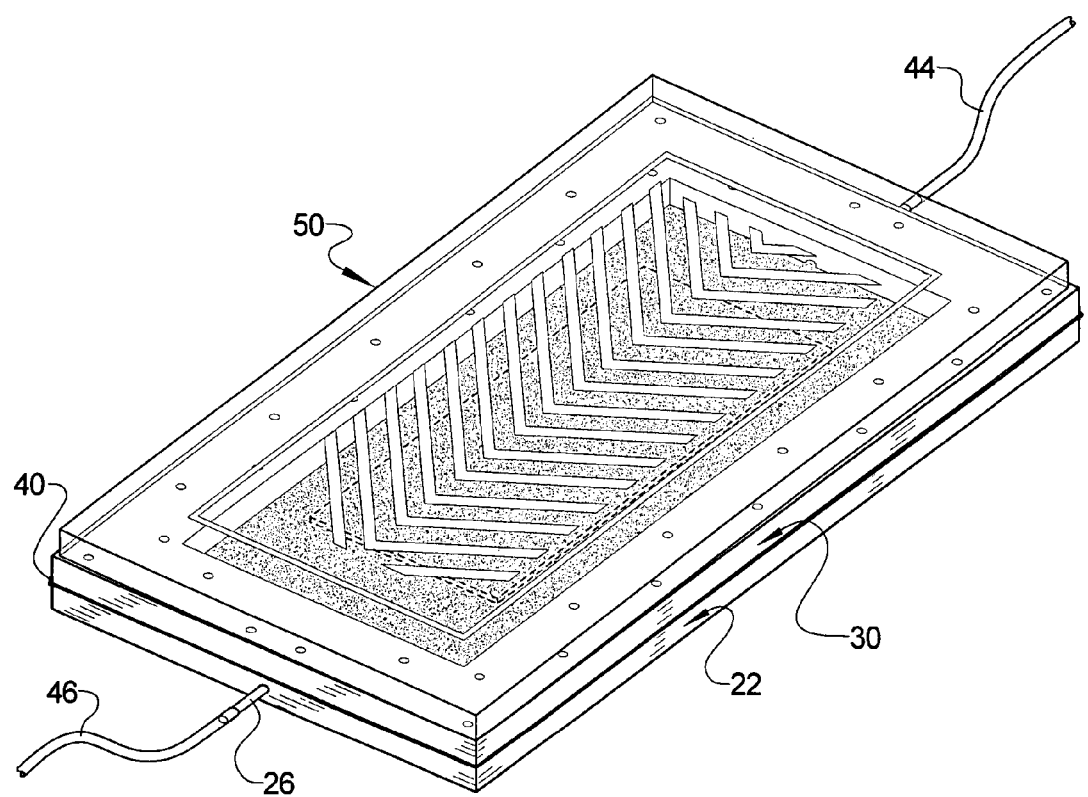
FIG. 5 is a perspective view, viewed from the bottom, of the upper frame member mated with the lower frame member with resin being pulled through the resin chamber using the flow plate.

Referring now to the drawings, it is seen that the resin infusion between double flexible tooling system of the present invention, generally denoted by reference numeral 10, comprises a housing 12 which has an interior chamber. A sealing gasket 14 is located on the outer periphery of the open top of the housing 12. A mold 16, corresponding to the shape of the finished end product, is placed into the interior chamber of the housing 12. The housing 12 acts as a vacuum chamber. A vacuum manifold 18 having an appropriate gauge 20 is attached to the housing 12, such that the vacuum manifold 18 is connected to an appropriate source capable of creating a vacuum so that a vacuum pressure can be created within the interior chamber of the housing 12 when the housing 12 is appropriately sealed as discussed below.

An upper frame member 22 has an inlet port 24 and an outlet port 26 on opposite sides of thereof. The inlet port 24 and the outlet port 26 each lie on the same plane as the plane of the upper frame member 22. An appropriate upper diaphragm 28 lies across the opening of the upper frame member 22. A corresponding lower frame member 30 has a shape that is similar to the shape of the upper frame member 22 and has a lower diaphragm 32 spanning its opening. The upper diaphragm 28 and the lower diaphragm 32 are each made from an appropriate material that is sufficiently elastic, such as silicone rubber, the greater the elasticity of the diaphragms 28 and 32, the more intricacy can be introduced into the part to be manufactured by the resin infusion between double flexible diaphragms tooling system 10. If desired, the surfaces of the upper diaphragm 28 and the lower diaphragm 32 that come in contact with the flowing resin R, discussed below, can be coated with an appropriate nonstick material, such as TPFT, etc., in order to help reduce the surface tension of the resin R that flows between the two diaphragms 28 and 32 during device 10 operation. Reduced surface tension of the resin R helps increase the overall surface quality of the product being manufactured by the device 10.

In order to use the resin infusion between double flexible diaphragms tooling system 10 of the present invention, a mold 16 in the desired shape of the finished product is selected and placed into the interior chamber of the housing 12. A fiber reinforcement mat 34 is precut to fit the desired shape of the product to be formed and is placed onto the lower diaphragm 32 of the lower frame member 30. The upper frame member 22 is brought down onto the lower frame member 30 such that the reinforcement mat 34 is sandwiched between the upper diaphragm 28 and the lower diaphragm 32 in a resin chamber 36 that is created between the two diaphragms 28 and 32. The upper frame member 22 is attached to the lower frame member 30 in any appropriate fashion such as by using the illustrated screws 38. A gasket 40 is positioned between the upper frame member 22 and the lower frame member 30 so that the resin chamber 36 holding the reinforcement mat 34 is sealed and airtight.

The attached upper frame 22 and lower frame 30 are placed onto a lifting mechanism. The lifting mechanism, of which only one of its lifting arms 42 is illustrated, is any appropriate device known in the art for lifting and lowering the attached upper frame 22 and lower frame 30 such as a hydraulic lift, a solenoid lift, a servo motor lift, etc. The inlet port 24 is connected to a source of resin (not illustrated) by an appropriate inlet conduit 44. An outlet conduit 46 is also connected to the outlet port 26 in order to allow excess resin R to flow out of the resin chamber 36, which excess resin R gets caught in a simple resin trap 48 or other appropriate resin catch device.

A vacuum is pulled onto the resin chamber 36 via the outlet conduit 46 in any appropriate fashion known in the art in order to draw resin R, typically a low viscosity resin, into the resin chamber 36 in order to wet the reinforcement mat 34 being held therein. As mentioned, the inlet port 24 and the outlet port 26 lie on the same plane as that of the upper frame member 22 so that a true two-dimensional flow is achieved (as opposed to a 2.5-dimensional flow that is created when resin is pulled through an inlet port located on one of the diaphragms) which greatly improves resin R flow through the resin chamber 36 allowing a continuous resin R flow through the resin chamber 36 and helps avoid dry spots on the reinforcement mat 34. Additionally, the use of the simple resin trap 48 catches any excess resin R and prevents the resin R from causing damage to the vacuum creating mechanism downstream.

Next the lifting mechanism lowers the attached upper frame 22 and lower frame 30 that has the wetted reinforcement mat 34 within the resin chamber 36 onto the mold 16. The gasket 14 located on the upper periphery of the housing 12 (the gasket 14 can also be located on the lower frame member 30) creates an airtight seal within the housing 12 when the lower frame 30 is lowered thereonto. Once the resin chamber 36 is properly seated on the mold 16, a vacuum is pulled within the interior chamber of the housing 12. This vacuum draws the wetted reinforcement mat 34 within the resin chamber 36 into pressing engagement with the mold 16 in order for the wetted reinforcement mat 34 to take on the shape of the mold 16. The mold 16 may be made from a porous material so that the diaphragms 28 and 32 and the reinforcement mat 34 sandwiched therebetween can be pulled into any valleys or crevices found on the mold 16. Once the resin R is properly cured, the upper frame 22 is detached from the lower frame 30 and the finished product is removed.

An optional flow plate 50 can be used during the resin pull phase of part forming. The flow plate 50 is made from a relatively stiff material, such as metal, hard plastic, etc., and has a series of V-shaped grooves 52 machined therein, the grooves 52 having varying depths. A seal 54 encompasses the grooves 52 which seal 54 corresponds to the shape and size of the diaphragms 28 and 32. In operation, the flow plate 50 is positioned underneath the lower frame member 30 such that the machined grooves 52 are positioned underneath the lower diaphragm 32 or the flow plate 50 is positioned over the upper frame member 22 such that the machined grooves 52 are positioned overtop the upper diaphragm. When the resin R flows through the resin chamber 36, the grooves 52 pressing on one of the diaphragms 28 or 32 create turbulence in the flowing resin R within the resin chamber 36 thereby increasing the resin infusion rate of the device 10. The flow plate 50, by being stiff, also helps prop up relatively large reinforcement mats 34 and the diaphragms 28 and 32 in order to help preserve the flatness of the resin chamber 36 and the reinforcement mat 34 held therein in order to help maintain the true two-dimensional flow of resin R through the resin chamber 36.

While the invention has been particularly shown and described with reference to an embodiment thereof, it will be appreciated by those skilled in the art that various changes in form and detail may be made without departing from the spirit and scope of the invention.

We claim:

1. An infusion system comprising:
   a housing having an upper flexible diaphragm and a lower flexible diaphragm, the upper diaphragm and the lower diaphragm forming a cavity therebetween;
   a fiber reinforcement mat positioned within the cavity;
   a mold positioned below the lower diaphragm and capable of being pressed into the lower diaphragm; and
   a flow plate having a series of grooves therein, wherein the flow plate is positioned external to the cavity, either underneath the lower diaphragm or overtop the upper diaphragm such that the grooves press into either the lower diaphragm or the upper diaphragm;
   wherein a vacuum is created within the cavity causing resin to be drawn into the cavity, wherein the resin that is drawn into the cavity interacts with the grooves when flowing within the cavity, and thereafter the mold and the lower diaphragm are pressed together.

2. The infusion system as in claim 1 wherein the resin is drawn into the cavity through an inlet gate.

3. The infusion system as in claim 1 wherein a surface of the upper diaphragm is coated with a nonstick material.

4. The infusion system as in claim 3 wherein a surface of the lower diaphragm is coated with a nonstick material.

5. The infusion system as in claim 1 wherein the mold is made from a porous material.

6. The infusion system as in claim 1 wherein the grooves are generally V-shaped.

7. The infusion system as in claim 1 wherein the grooves have variable depths.

8. An infusion system comprising:
   a housing having an upper flexible diaphragm and a lower flexible diaphragm, the upper diaphragm and the lower diaphragm capable of forming a sealed cavity therebetween;
   a fiber reinforcement mat positioned within the cavity;
   a mold positioned below the lower diaphragm and capable of being pressed into the lower diaphragm;
   a flow plate having a series of grooves therein, wherein the flow plate is positioned external to the cavity, either underneath the lower diaphragm or overtop the upper diaphragm, wherein the grooves press into either the lower diaphragm or the upper diaphragm; and
   wherein a vacuum is created within the cavity causing resin to be drawn into the cavity via an inlet gate such that the inflowing resin interacts with the grooves thereby causing turbulence within the resin that is flowing within the cavity and thereafter the mold and the lower diaphragm are pressed together.

9. The infusion system as in claim 8 wherein a surface of the upper diaphragm is coated with a nonstick material.

10. The infusion system as in claim 9 wherein a surface of the lower diaphragm is coated with a nonstick material.

11. The infusion system as in claim 8 wherein the mold is made from a porous material.

12. The infusion system as in claim 8 wherein the grooves are generally V-shaped.

13. The infusion system as in claim 8 wherein the grooves have variable depths.

14. A method of resin infusion comprising the steps of:
   providing a housing having an upper flexible diaphragm and a lower flexible diaphragm, the upper diaphragm and the lower diaphragm capable of forming a cavity;
   positioning a fiber reinforcement mat positioned within the cavity;
   providing a mold and positioning the mold below the lower diaphragm;
   providing a flow plate having a series of grooves therein, and positioning the flow plate external to the cavity, either underneath the lower diaphragm or overtop the upper diaphragm;
   creating a vacuum within the housing causing resin to be drawn into the cavity with the resin interacting with the grooves; and
   pressing the mold into the lower diaphragm.

15. The method as in claim 14 wherein the resin is drawn into the cavity through an inlet gate.

16. The method as in claim 15 further comprising the step of coating a surface of the upper diaphragm with a nonstick material.

17. The method as in claim 16 further comprising the step of coating a surface of the lower diaphragm with a nonstick material.

18. The method as in claim 14 wherein the grooves are generally V-shaped.

19. The method as in claim 14 wherein the grooves have variable depths.

20. The system of claim 1 wherein the mold is pressed into the lower diaphragm least partially by lowering the upper diaphragm and the lower diaphragm onto the mold.

21. The system of claim 1 wherein the mold is pressed into the lower diaphragm at least partially by creating a vacuum within a chamber created within the housing and under the lower diaphragm.

* * * * *